(12) United States Patent
Rafaitin et al.

(10) Patent No.: US 9,360,094 B2
(45) Date of Patent: Jun. 7, 2016

(54) MECHANICAL MEMBER

(71) Applicant: SAGEM DEFENSE SECURITE, Boulogne-Billiancourt (FR)

(72) Inventors: Julie Rafaitin, Boulogne-Billancourt (FR); Etienne Merlet, Boulogne-Billancourt (FR)

(73) Assignee: SAGEM DEFENSE SECURITE, Boulogne-Billancourt (FR)

( * ) Notice: Subject to any disclaimer, the term of this patent is extended or adjusted under 35 U.S.C. 154(b) by 0 days.

(21) Appl. No.: 14/363,244

(22) PCT Filed: Dec. 3, 2012

(86) PCT No.: PCT/EP2012/074280
§ 371 (c)(1),
(2) Date: Jun. 5, 2014

(87) PCT Pub. No.: WO2013/083531
PCT Pub. Date: Jun. 13, 2013

(65) Prior Publication Data
US 2014/0331799 A1    Nov. 13, 2014

(30) Foreign Application Priority Data
Dec. 6, 2011   (FR) ...................................... 11 61239

(51) Int. Cl.
*F16H 57/04*   (2010.01)
*F16H 25/22*   (2006.01)
*F16C 33/10*   (2006.01)

(52) U.S. Cl.
CPC ............ *F16H 25/22* (2013.01); *F16C 33/1025* (2013.01); *F16H 57/041* (2013.01); *F16H 57/042* (2013.01); *F16H 57/0497* (2013.01); *F16C 33/1095* (2013.01); *F16H 25/2252* (2013.01); *Y10T 74/18744* (2015.01)

(58) Field of Classification Search
None
See application file for complete search history.

(56) References Cited

U.S. PATENT DOCUMENTS

| | | | |
|---|---|---|---|
| 2006/0090582 A1* | 5/2006 | Osterlaenger et al. | 74/424.88 |
| 2007/0191177 A1* | 8/2007 | Nagai et al. | 475/291 |
| 2008/0032904 A1* | 2/2008 | Watanabe et al. | 508/590 |
| 2009/0302550 A1* | 12/2009 | Garin et al. | 277/572 |
| 2010/0269616 A1* | 10/2010 | Merlet et al. | 74/424.92 |
| 2012/0240706 A1* | 9/2012 | Ohkubo et al. | 74/424.83 |

FOREIGN PATENT DOCUMENTS

| | | | |
|---|---|---|---|
| FR | 2 925 640 A1 | | 6/2009 |
| JP | 2007170508 A | * | 7/2007 |

* cited by examiner

*Primary Examiner* — Justin Holmes
(74) *Attorney, Agent, or Firm* — Muncy, Geissler, Olds & Lowe, P.C.

(57) ABSTRACT

The invention relates to a mechanical member wherein a first part in contact with a second part movable relative to the first part, at least one of the parts including a coating of solid lubricant at least at contact zones between the first part and the second part, the solid lubricant being suitable on its own for lubricating the mechanical member. According to the invention, the mechanical member includes retention and capillary distribution means for distributing a fluid between the parts in such a manner as to form a film between said parts, which film can be pierced temporarily at each contact zone.

16 Claims, 2 Drawing Sheets

MECHANICAL MEMBER

The invention relates to a mechanical member comprising a first part in contact with a second part that is movable relative to the first part. By way of example, the invention thus relates to planetary roller screws and planetary roller bearings, and it is intended particularly but not exclusively, to such mechanical members that are subjected in operation to high axial loads and to movements that are small and/or slow.

TECHNOLOGICAL BACKGROUND OF THE INVENTION

For the mechanical members that are constituted by planetary roller screws and bearings, Document FR 2 925 640 discloses having recourse to a liquid lubricant, preferably an oil with diluted additives, suitable for being distributed by capillarity between the screw, the planetary rollers, and the nut in order to lubricate those elements.

Planetary roller screws and bearings are sometimes used in applications where they are subjected in operation to large axial loads and to movements that are small and/or slow. This applies for example when a planetary roller screw or bearing actuates a moving element of an aircraft such as a flight control surface.

It is found that liquid lubricants are of little or no effect in the presence of large axial loads, in particular when associated with movements of the planetary roller screw or bearing that are small and/or slow. It is extremely difficult under such conditions to obtain a uniform film of oil between the planetary rollers and the screw or the nut of the planetary roller screw or between the rollers and the rings of the planetary roller bearing, thereby greatly degrading the operation of the planetary roller screw or bearing. This drawback is made worse when the liquid lubricant has low viscosity.

Proposals have also been made to lubricate such a planetary roller screw or bearing by means of grease. Grease withstands higher axial loads and is well adapted to movements that are smaller and/or slower. In contrast, its performance is not always maintained long enough without maintenance for certain particular applications such as applications in the field of aviation.

Furthermore, grease presents numerous other drawbacks, in particular the fact of having viscosity that varies greatly with temperature. Thus, at a temperature close to −30 degrees Celsius (° C.), most, greases tend to freeze, thereby slowing down or preventing rotation of the planetary rollers. Unfortunately, when a planetary roller screw or bearing is on board an aircraft, e.g. to actuate a flight control surface, the planetary roller screw or bearing is subjected to low temperatures of about −50° C., on average. Lubrication by means of grease is therefore inappropriate for such an application.

Furthermore, grease tends to become expelled away from the various zones of contact between the planetary rollers and the screw or the nut, or between the rollers and the rings of the bearing it is therefore necessary to refill the planetary roller screw or bearing regularly with grease in order to limit that phenomenon.

There also exist solid lubricants. Consideration has been given to having recourse to a so-called "dry" solid lubricant, that consists in covering portions of the mechanical member, such as the screw and the nut and/or the planetary rollers in a coating of solid lubricant. In a first embodiment, particles of solid lubricant are incorporated in the screw and the nut and/or the planetary rollers so that the particles become released progressively as a result of wear. By way of example, the coating comprises molybdenum bisulfide ($MoS_2$). In a second embodiment, the lubricant coating is deposited on the surface of the screw and the nut or of the planetary rollers. By way of example, the coating comprises tungsten bisulfide ($WS_2$).

Although solid lubricants are better than liquid lubricants at withstanding higher axial loads associated with movements that are smaller and/or slower, they present the drawback of being extremely sensitive to the climatic, thermal, and/or chemical conditions that are to be encountered in numerous industrial fields, such as the field of aviation, for example.

In particular, solid lubricants tend to degrade in the presence of water and thus lose all their effectiveness. Water can sometimes even make solid lubricants aggressive relative to the surfaces on which the solid lubricants are arranged. With certain coatings, e.g. with $MoS_2$ or $WS_2$ coatings, this degradation leads to two aggressive components being formed, namely an abrasive oxide and sulfuric acid.

In addition, a gaseous compound can infiltrate into the planetary roller screw or bearing and can condense inside said screw or bearing in the form of a liquid that might react with the solid lubricant. In general, chemical compounds can spoil any lubricant, but they act more aggressively in spoiling solid lubricants. Thus, the mere presence of a gaseous chemical compound may suffice to degrade the solid lubricant, in particular in the zones of contact in the planetary roller screw or bearing, where friction in said zones amplifies the reactivity of the gaseous chemical compound.

The sensitivity of solid lubricants to thermal, climatic, and/or chemical conditions can thus have severe consequences concerning the operation of the planetary roller screw or bearing so as to make it difficult to have recourse to such lubricants in certain applications such as the field of aviation.

OBJECT OF THE INVENTION

The object of the invention is to propose a mechanical member with lubrication that is improved compared with the solutions of the prior art.

BRIEF SUMMARY OF THE INVENTION

To this end, the invention provides a mechanical member comprising a first part in contact with a second part movable relative to the first part, at least one of the parts including a coating of solid lubricant at least at contact zones between the first part and the second part, the solid lubricant being suitable on its own for lubricating the mechanical member.

According to the invention, the mechanical member includes retention and capillary distribution means for distributing a fluid between the parts in such a manner as to form a film between said parts, which film can be pierced temporarily at each contact zone.

The fluid film protects the solid lubricant from external attacks without itself being used to perform the function of lubricating the mechanical member. The film is thus pierced temporarily for direct contact between the parts in each zone of contact between the parts, which zones are of very small dimensions.

In a zone of contact, a surface of the first part is in contact with a surface of the second part. Said surfaces naturally present defects or irregularities such that contact between the surfaces cannot be perfect. The zone of contact is thus not formed by perfectly smooth contact between the two surfaces but by a multitude of points of contact between the two surfaces, thereby enabling the film to reform very quickly and easily once contact between the two surfaces ceases.

In a preferred embodiment, the mechanical member comprises a first element, a second element surrounding the first element coaxially, and a plurality of rolling bodies circumferentially distributed between an outside surface of the first element, and an inside surface of the second element in order to co-operate with said surfaces, at least the inside surface and the outside surface or at least the rolling bodies including a coating of solid lubricant at least at the zones of contact between each rolling body and the outside surface of the first element and the inside surface of the second element, the retention and capillary distribution means being arranged in such a manner as to form a film, between said rolling bodies and each surface, which film can be pierced temporarily at each zone of contact between each rolling body and said surface.

In this embodiment, the rolling body and one of the elements form the above-mentioned first and second parts.

The film of fluid protects the solid lubricant from external attacks without being used itself to perform a function of lubricating the mechanical member. The film is thus pierced temporarily for direct contact between the rolling bodies and the first element or the second element in each very small zone of contact between a rolling body and the first element or between a rolling body and the second element. The solid lubricant as uncovered in this way in the zone of contact provides the lubrication, while the fluid forms a capillary meniscus around the zone of contact that ensures that the entire film is maintained outside the zone of contact in order to protect the solid lubricant.

Furthermore, since the fluid does not contribute to lubrication, it is not a "working" fluid from a mechanical point of view, and as a result very little of the fluid is consumed. Thus, a small initial quantity of fluid suffices for the lifetime of the mechanical member. As a result, the retention and capillary distribution means are small in volume and therefore have little impact on the size or the weight of the mechanical member. Furthermore, since the fluid is not a "working" fluid from a mechanical point of view, it need not have any solid additives to enable it to work at very high pressure, and the fluid may have extremely low viscosity. The fluid can thus be distributed easily by capillarity within the mechanical member.

Advantageously, there is no need to provide sealing of the mechanical member since the film of fluid is held in place by capillarity. The distribution of the rolling bodies over the entire corresponding surfaces of the first element and of the second element also contributes to maintaining the film of fluid in place.

Furthermore, distributing the fluid by capillarity from retention and distribution means makes it possible to ensure that the film of fluid is always present between the rolling bodies and both the first element and the second element, in particular in the zones of contact. Furthermore, there is no need to ensure that the mechanical member is hermetically sealed, since the film of fluid itself protects the rolling bodies, the first element, and the second element from external attack by moisture or some other substance.

The mechanical member of the invention is thus very robust and very reliable without requiring much maintenance.

Another advantage is that the fluid serves to damp the microvibrations to which the rolling bodies, the first element, and the second element are subjected, in particular in the zones of contact.

Furthermore, although the film is of small thickness, the fluid limits thermal stresses in the zones of contact, and in particular it limits heating of the rolling bodies, of the inside surface, and of the outside surface in the zones of contact.

In remarkable manner, the fluid also serves to contribute to holding the coating of solid lubricant in place on the rolling bodies or on the outside surface and the inside surface.

Other characteristics and advantages of the invention appear on reading the following description of particular, non-limiting embodiments of the invention.

BRIEF DESCRIPTION OF THE DRAWINGS

Reference is made to the accompanying drawings, in which.

DETAILED DESCRIPTION OF THE INVENTION

Figure 1:
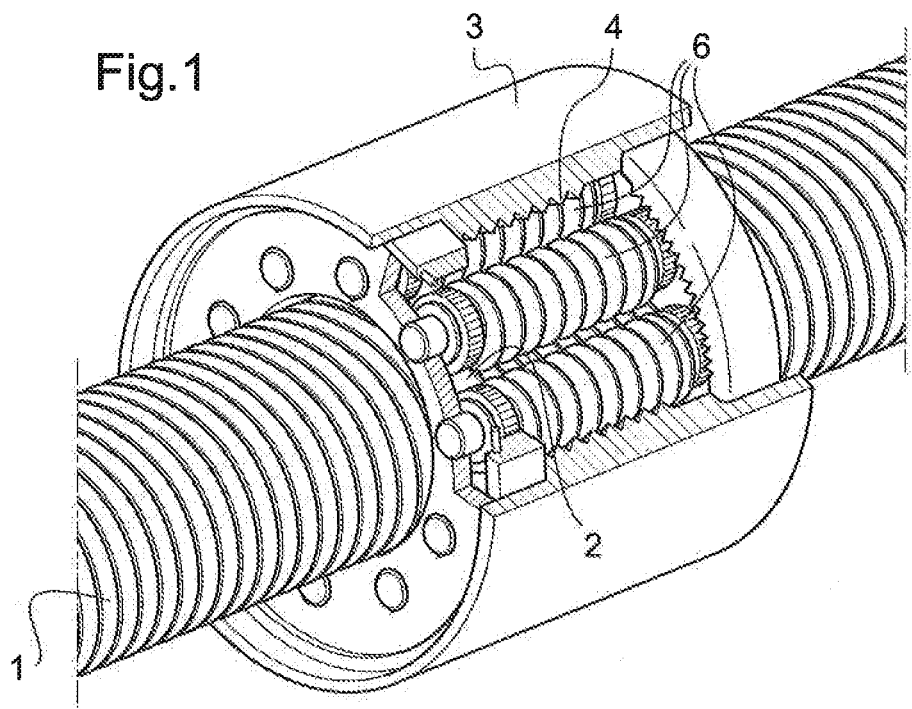
FIG. 1 is a cutaway perspective view of a planetary roller screw in accordance with the invention.
Figure 2:
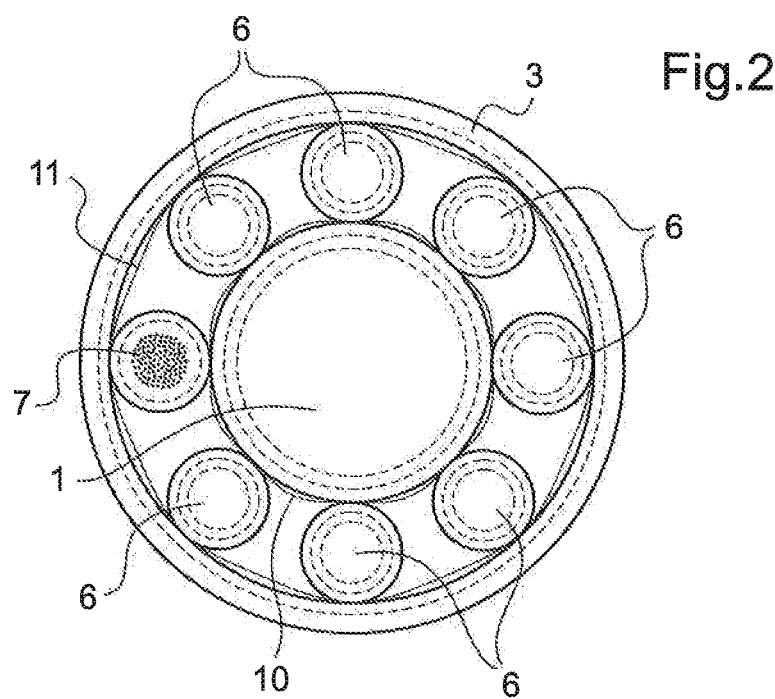
FIG. 2 is a diagrammatic cross-section view of the FIG. 1 planetary roller screw in a particular embodiment of the invention.

With reference to FIGS. 1 and 2, the mechanical member of the invention in this example is a planetary roller screw that comprises a screw 1 having a threaded outside surface 2 and a nut 3 surrounding the screw 1 coaxially and including an inside surface 4 that is tapped, the nut 3 being engaged on the screw 1.

A cylindrical housing is provided in the nut 3, and it receives a plurality of threaded planetary rollers 6 that are distributed circumferentially between the outside surface 2 and the inside surface 4 in order to co-operate with them, the threads on the outside surface 2, on the inside surface 4, and the planetary rollers 6 having the same pitch. The planetary rollers 6 also have toothed ends meshing with toothed rings of the nut 3 in order to synchronize the planetary rollers 6.

The above-described structure and the operation of a planetary roller screw are themselves known in principle and they are not described in greater detail herein.

At least the inside surface 4 and the outside surface 2 or at least the rolling body 6 include a coating of solid lubricant, at least in the zones of contact between each rolling body 6 and the outside surface 2 and the inside surface 4, the solid lubricant being capable on its own of lubricating the mechanical member. In a preferred embodiment, the inside surface 4, the outside surface 2, and the rolling bodies 6 all include respective coatings of solid lubricant, as represented by dashed lines in FIG. 2.

The coating of solid lubricant preferably comprises solid lubricant particles that have been deposited on the surface of the screw 1, of the nut 3, and of the planetary rollers 6 in order to coat those surfaces without being incorporated in the superficial layer of the screw 1, the nut 3, or the planetary rollers 6. By way of example, the coating of solid lubricant comprises tungsten bisulfide ($WS_2$).

According to the invention, the planetary roller screw includes retention and capillary distribution means (represented by dots in FIG. 2) for retaining a fluid and for distributing it between the planetary rollers 6 and the inside surface 4, and also between the planetary rollers 6 and the outside surface 2 so as to form a first film 10 between the planetary rollers 6 and the outside surface 2, which film may be pierced temporarily at each zone of contact between each roller 6 and the outside surface 2, and so as to form a second film 11 between the planetary rollers 6 and the inside surface 4, which film can be pierced temporarily at each zone of contact between each planetary roller 6 and the inside surface 4.

The fluid is thus spread in particular over all of the potential contact zones of each planetary roller 6 with the screw 1 and with the nut 3 so as to protect the surfaces of the planetary rollers 6, of the screw 1, and of the nut 3.

In this example, the retention and capillary distribution means are associated with one of the planetary rollers that is referred to below as the retention planetary roller 7.

Figure 3:
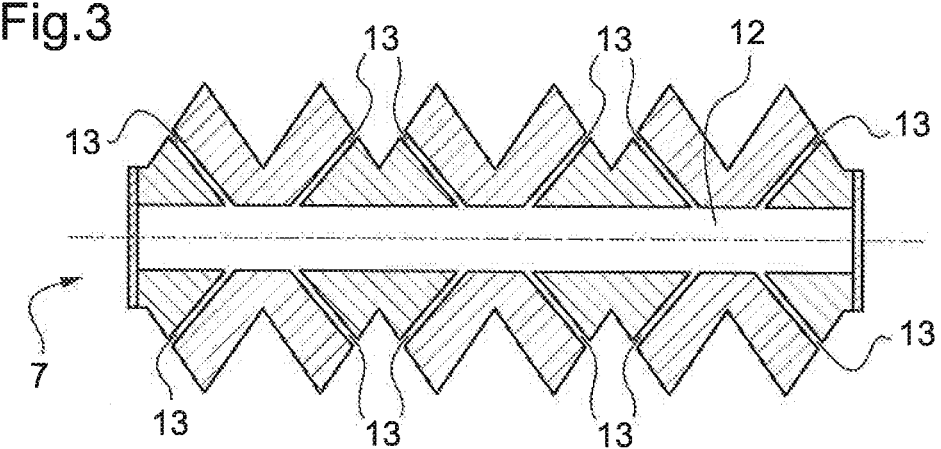
FIG. 3 is a diagrammatic longitudinal section view of a planetary roller of the FIG. 1 planetary roller screw in a particular embodiment of the invention.

With reference to FIG. 3, in a particular embodiment, the retention and capillary distribution means comprise a tank of fluid 12 arranged in the retention planetary roller 7. The tank 12 is preferably in the form of a cylindrical cavity lying coaxially on a longitudinal axis of the retention planetary roller 7. The retention and capillary distribution means also include a plurality of channels 13 that are formed along the retention planetary roller 7 between the tank 12 and each thread flank of the retention planetary roller 7. In this embodiment, the fluid naturally has viscosity and capillary properties that are compatible with the dimensions of said channels 13.

In a preferred embodiment, the fluid has low viscosity. A viscosity of low value varies little with temperature. Thus, even if the planetary roller screw is subjected to temperatures that are very low, the fluid does not congeal. In preferred manner, the fluid has viscosity lying in the range 1 square millimeter per second ($mm^2/s$) to 2000 $mm^2/s$ at a temperature of 25° C. while having a freezing point lying in the range −40° C. to −90° C. In still more preferred manner, the fluid has viscosity lying in the range 1 $mm^2/s$ to 10 $mm^2/s$ at 25° C. while having a freezing point lying in the range −60° C. to −85° C.

Although the film is of small thickness, it serves to limit thermal stresses at the contact zones. In a preferred embodiment, the fluid also has high thermal conductivity so as to improve this limitation of thermal stresses.

The film must also be capable of being temporarily penetrated or "pierced" in order to allow direct contact to take place between the planetary rollers 6 and the screw 1 or the nut 3 in each of the very limited contact zones between a planetary roller 6 and the screw 1 or between a planetary roller 6 and the nut 3, and it must also be capable of reforming spontaneously as soon as contact ceases. In a preferred embodiment, the fluid has dynamic capillary properties (viscosity, surface tension, . . . ) suitable for quickly reforming a uniform film after the film has been pierced temporarily.

Thus, and preferably in order to satisfy the capillary criterion, the fluid is a fluid of polar type. In even more preferred manner, the fluid is a silicone fluid.

In operation, at a contact zone between one of the planetary rollers 6 and, for example, the outside surface 2 of the screw 1, the film is pierced so that the planetary roller 6 is directly in contact with a portion of the outside surface 2. The solid lubricant as uncovered in this way at the contact zone provides lubrication. The fluid forms a capillary meniscus around the contact zone, thereby ensuring that the integrity of the film is maintained outside the contact zone in order to protect the solid lubricant. When the planetary roller 6 moves relative to the portion of the outside surface 2, contact ceases in that portion. The film then reforms spontaneously over said portion, because of the dynamic capillary properties of the fluid forming the film, thereby once more protecting the solid lubricant.

Naturally, the invention is not limited to the embodiment described and embodiment variants may be applied thereto without going beyond the ambit of the invention as defined, by the claims.

In particular, although the mechanical member described is a planetary roller screw, the mechanical member could be a planetary roller bearing, a ball bearing, or a roller bearing, a needle thrust bearing, a recirculation roller screw, a gear, and more generally any other mechanical member comprising a first part in contact with a second part that is movable relative to the first part. With a planetary roller bearing, the first element is an inner ring, the second element is an outer ring, and the rolling bodies are planetary rollers.

Although the screw 1, the nut 3, and the planetary rollers 6 in this example all have their own coatings of solid lubricant, it is possible for only the screw 1 and the nut 3 to have respective coatings of solid lubricant. In a variant, it is possible for only the planetary rollers 6 to have coatings of solid lubricant. The coating of solid lubricant may cover all or part of the outside surface 2, all or part of the inside surface 4, or all or part of the surfaces of the planetary rollers 6, providing it covers at least the contact zones.

The retention and capillary distribution means are not necessarily incompatible with a coating of solid lubricant. Nevertheless, and preferably, if the first element and the second element are the only elements that have coatings of solid lubricant, then the retention and capillary distribution means are arranged in at least one of the rolling bodies. In a variant, if the rolling bodies are the only elements to have coatings of solid lubricant, then the retention and capillary distribution means are arranged in the first element and the second element.

Although in this example the coating of solid lubricant comprises $WS_2$, the coating of solid lubricant could comprise any other material suitable for constituting a solid lubricant, and for example it could comprise molybdenum bisulfide ($MoS_2$), graphite, . . . . The coating of solid lubricant could comprise particles of solid lubricant incorporated in the superficial portions of the surfaces of the screw 1 and of the nut 3 and/or of the planetary rollers 6 so that wear of these elements progressively uncovers said lubricating solid particles.

Figure 5:
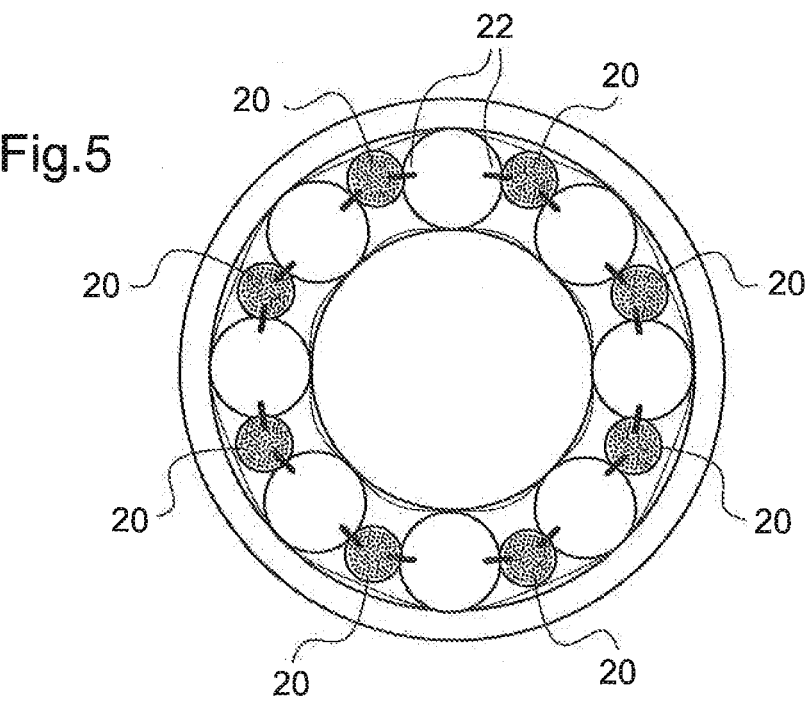
FIG. 5 is a diagrammatic cross-section view of the FIG. 1 planetary roller screw in another particular embodiment of the invention.

With reference to FIG. 5, although the retention and capillary distribution means in this example are arranged in one of the planetary rollers, the retention and distribution means could be arranged in some greater number of the planetary rollers 6, or indeed in each planetary roller 6. In a variant, the retention and capillary distribution means could be arranged in auxiliary rolling bodies 20. Each auxiliary rolling body 20 would be in contact with at least one of the planetary rollers 6 by being arranged radially relative thereto but without coming into contact with the first element or the second element. Each auxiliary rolling body 20 includes resilient retaining means 22 (only two of which are numbered in FIG. 5) so as to be urged substantially radially into contact with the associated planetary roller 6. The auxiliary rolling bodies 20 are preferably arranged symmetrically relative to the planetary rollers 6. In preferred manner, each planetary roller 6 is associated with at least one auxiliary rolling body 20.

In a variant, each auxiliary rolling body 20 is in contact with two adjacent planetary rollers 6 simultaneously, being arranged radially relative thereto. The auxiliary rolling bodies 20 are preferably distributed symmetrically relative to the planetary rollers 6.

The retention and capillary distribution means may be different from those described. For example, the channels could be arranged in a single diametral plane or they could be mutually offset angularly so as to open out in the thread flanks of the planetary rollers in different directions extending transversely to the longitudinal axis of the associated planetary roller.

Figure 4:
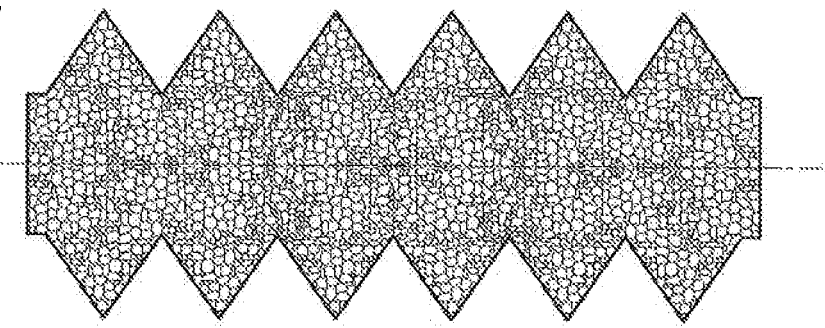
FIG. 4 is a diagrammatic longitudinal section view of the FIG. 1 planetary roller screw in another particular embodiment of the invention.

Instead of a tank and channels, the retention and capillary distribution means could comprise a supply inside at least one of the planetary rollers (as shown in FIG. 4) and/or inside at least one auxiliary rolling body, the supply being formed by a set of pores in the planetary roller and/or in the auxiliary rolling body. The planetary roller and/or the auxiliary rolling body then preferably includes an outer layer of material that is very porous. In a variant, the planetary roller and/or the auxiliary rolling body is made of a material that is very porous. In another variant, the retention and capillary distribution means include both a tank of the type shown in FIG. 3 and an internal supply enabling capillary distribution to take place via a porous outer layer. Nevertheless, for applications in which the planetary roller screw is subjected to large axial loads, it is not recommended to use porous planetary rollers since they would be too fragile. It is then possible to have recourse to auxiliary rolling bodies, or to a selection of planetary rollers of the planetary roller screw that are dimensioned specifically to withstand a load that is smaller than the load withstood by the remaining planetary rollers, which remaining rollers are capable on their own of withstanding the entire mechanical load.

In general, it is appropriate to design the mechanical member relative to the applications for which it is to be used, in particular so as to ensure that the fluid always forms a continuous film between the rolling bodies and each of the two elements.

For example, when the mechanical member is to travel regularly along long strokes, in particular strokes that are maximum or almost maximum strokes, the retention and capillary distribution means may be associated with a number of rolling bodies that is smaller than all of the rolling bodies. Likewise, the number of channels 13 may be smaller than the number shown. The retention and capillary distribution means could then comprise a single channel 13 for connecting the tank 12 to the threads of the associated planetary roller 6 in the embodiment shown in FIG. 3, or a single channel for connecting a tank to an outer wall of a rolling body or of an auxiliary rolling body.

Furthermore, although in this example the fluid is a fluid of polar type, and more precisely a silicone fluid, the fluid could be some other fluid. If it is particularly desired for the solid lubricant to be protected by a fluid that is very insensitive to the chemical and thermal environment of the solid lubricant, it is advantageous to use a fluid based on perfluoropolyether (PFPE).

Since the fluid is not involved in lubricating the mechanical member and since it is not a "working" fluid in the mechanical meaning of the term, there is no need to select the fluid as a function of its lubricating characteristics or of its mechanical characteristics. As mentioned above, the viscosity of the fluid and its dynamic capillary properties are important parameters that make it possible to select a fluid appropriate for the conditions of use of the mechanical member. The thermal conductivity of the fluid may also be of importance, depending on the application for which the mechanical member is intended. The fluid may also be selected mainly as a function of the solid lubricant or as a function of the application for which the mechanical member is intended.

The invention claimed is:

1. A mechanical member comprising a first part in contact with a second part movable relative to the first part, at least one of the parts including a coating of solid lubricant at least at contact zones between the first part and the second part, the solid lubricant being suitable on its own for lubricating the mechanical member, which member is characterized in that it includes retention and capillary distribution means for distributing a liquid between the parts in such a manner as to form a film between said parts, which film can be pierced temporarily at each contact zone.

2. A mechanical member according to claim 1, comprising a first element, a second element surrounding the first element coaxially, and a plurality of rolling bodies circumferentially distributed between an outside surface of the first element and an inside surface of the second element in order to co-operate with said surfaces, at least the inside surface and the outside surface or at least the rolling bodies including a coating of solid lubricant at least at the zones of contact between each rolling body and the outside surface of the first element and the inside surface of the second element, the retention and capillary distribution means being arranged in such a manner as to form a film between said rolling bodies and each surface, which film can be pierced temporarily at each zone of contact between each rolling body and said surface, each rolling body and one or the other of the elements then respectively constituting the first part and the second part.

3. A mechanical member according to claim 1, wherein the liquid has a viscosity lying in the range 1 mm$^2$/s to 2000 mm$^2$/s at 25° C., while having a freezing point lying in the range −40° C. to −90° C.

4. A mechanical member according to claim 1, wherein the liquid is a polar type fluid.

5. A mechanical member according to claim 1, wherein the liquid is a silicone fluid.

6. A mechanical member according to claim 1, wherein the liquid is based on perfluoropolyether (PFPE).

7. A mechanical member according to claim 2, wherein the first element is a screw, the second element is a nut, and the rolling bodies are planetary rollers.

8. A mechanical member according to claim 2, wherein the first element is an inner ring, the second element is an outer ring, and the rolling bodies are planetary rollers.

9. A mechanical member according to claim 1, wherein the coating of solid lubricant comprises molybdenum bisulfide ($MoS_2$).

10. A mechanical member according to claim 1, wherein the coating of solid lubricant comprises tungsten bisulfide ($WS_2$).

11. A mechanical member according to claim 2, wherein the retention and capillary distribution means are associated with all of the rolling bodies.

12. A mechanical member according to claim 2, wherein the retention and capillary distribution means comprise a liquid tank arranged in one of the rolling bodies, at least one channel being provided in the rolling body between the tank and an outer wall of the rolling body, the liquid having viscosity and capillary properties compatible with the dimensions of said channel.

13. A mechanical member according to claim 2, wherein the retention and capillary distribution means comprise an internal supply in at least one of the rolling bodies, which supply is formed by a set of pores in said rolling body.

14. A mechanical member according to claim 2, wherein the retention and capillary distribution means are arranged in at least one axially rolling body that is in contact with at least one of the rolling bodies by being arranged radially relative thereto but without coming into contact with the first element or the second element, and that includes resilient retention means to urge it substantially radially into contact with the associated rolling body.

15. A mechanical member comprising a first part in contact with a second part movable relative to the first part, at least one of the parts including a coating of solid lubricant at least at contact zones between the first part and the second part, the solid lubricant being suitable on its own for lubricating the mechanical member, which member is characterized in that it includes retention and capillary distribution means for distributing a fluid between the parts in such a manner as to form a film between said parts, which film can be pierced temporarily at each contact zone, wherein the mechanical member comprises a first element, a second element surrounding the first element coaxially, and a plurality of rolling bodies circumferentially distributed between an outside surface of the first element and an inside surface of the second element in order to co-operate with said surfaces, at least the inside surface and the outside surface or at least the rolling bodies including a coating of solid lubricant at least at the zones of contact between each rolling body and the outside surface of the first element and the inside surface of the second element, the retention and capillary distribution means being arranged in such a manner as to form a film between said rolling bodies and each surface, which film can be pierced temporarily at each zone of contact between each rolling body and said surface, each rolling body and one or the other of the elements then respectively constituting the first part and the second part, and wherein the first element is an inner ring, the second element is an outer ring, and the rolling bodies are planetary rollers.

16. A mechanical member comprising a first part in contact with a second part movable relative to the first part, at least one of the parts including a coating of solid lubricant at least at contact zones between the first part and the second part, the solid lubricant being suitable on its own for lubricating the mechanical member, which member is characterized in that it includes retention and capillary distribution means for distributing a fluid between the parts in such a manner as to form a film between said parts, which film can be pierced temporarily at each contact zone, wherein the mechanical member comprises a first element, a second element surrounding the first element coaxially, and a plurality of rolling bodies circumferentially distributed between an outside surface of the first element and an inside surface of the second element in order to co-operate with said surfaces, at least the inside surface and the outside surface or at least the rolling bodies including a coating of solid lubricant at least at the zones of contact between each rolling body and the outside surface of the first element and the inside surface of the second element, the retention and capillary distribution means being arranged in such a manner as to form a film between said rolling bodies and each surface, which film can be pierced temporarily at each zone of contact between each rolling body and said surface, each rolling body and one or the other of the elements then respectively constituting the first part and the second part, wherein the retention and capillary distribution means are arranged in at least one axially rolling body that is in contact with at least one of the rolling bodies by being arranged radially relative thereto but without coming into contact with the first element or the second element, and that includes resilient retention means to urge it substantially radially into contact with the associated rolling body.

* * * * *